(12) United States Patent
Bechtold et al.

(10) Patent No.: US 7,867,292 B2
(45) Date of Patent: Jan. 11, 2011

(54) PRISMATIC RECHARGEABLE BATTERY AND METHOD FOR PRODUCING SUCH A BATTERY

(75) Inventors: Dieter Bechtold, Bad Vibel (DE); Ralf Joswig, Buchholz (DE); Kai Pelz, Springe (DE)

(73) Assignee: Varta Automotive Systems GmbH, Hannover (DE)

( * ) Notice: Subject to any disclaimer, the term of this patent is extended or adjusted under 35 U.S.C. 154(b) by 296 days.

(21) Appl. No.: 12/068,728

(22) Filed: Feb. 11, 2008

(65) Prior Publication Data

US 2008/0134494 A1 Jun. 12, 2008

Related U.S. Application Data

(60) Division of application No. 11/455,911, filed on Jun. 19, 2006, now Pat. No. 7,790,310, which is a continuation of application No. PCT/DE2004/002587, filed on Nov. 23, 2004.

(30) Foreign Application Priority Data

Jan. 21, 2004 (DE) ........................ 10 2004 003 066

(51) Int. Cl.
*H01M 10/16* (2006.01)
(52) U.S. Cl. ..................................... 29/623.2; 29/623.1
(58) Field of Classification Search ........................ None
See application file for complete search history.

(56) References Cited

U.S. PATENT DOCUMENTS

| | | |
|---|---|---|
| 4,587,183 A | 5/1986 | McCartney, Jr. |
| 4,900,643 A | 2/1990 | Eskra et al. |
| 5,017,446 A | 5/1991 | Reichman et al. |
| 5,059,496 A | 10/1991 | Sindorf |

(Continued)

FOREIGN PATENT DOCUMENTS

EP 1 059 680 12/2000

(Continued)

OTHER PUBLICATIONS

International Preliminary Report on Patentability and Written Opinion of the International Searching Authority for PCT/DE2004/002587, date of mailing Jan. 22, 2007, 5 pages.

(Continued)

*Primary Examiner*—Ula C Ruddock
*Assistant Examiner*—Tony Chuo
(74) *Attorney, Agent, or Firm*—Foley & Lardner LLP

(57) ABSTRACT

A method for producing a prismatic rechargeable battery that includes providing a battery housing comprising a plurality of cell vessels separated by intermediate walls. The method also includes providing contact connector plates on opposite sides of each of the intermediate walls and electrically coupling the contact connector plates provided on opposite sides of the intermediate walls to each other through their associated intermediate walls. The method further includes arranging plate stacks in the cell vessels, each of the plate stacks having a plurality of contacts and coupling the electrical contacts of the plate stacks to contact connector plates provided on the intermediate walls. The method further includes closing the housing such that the cell vessels and the housing are sealed.

19 Claims, 10 Drawing Sheets

U.S. PATENT DOCUMENTS

| | | |
|---|---|---|
| 5,206,987 A | 5/1993 | Mix |
| 5,225,292 A | 7/1993 | Korinek et al. |
| 5,227,260 A | 7/1993 | Rose et al. |
| 5,288,565 A | 2/1994 | Gruenstern |
| 5,338,624 A | 8/1994 | Gruenstern et al. |
| 5,368,956 A | 11/1994 | Gruenstern et al. |
| 5,408,735 A | 4/1995 | Schleicher |
| 5,501,918 A | 3/1996 | Gruenstern et al. |
| 5,508,131 A | 4/1996 | Bowen et al. |
| RE36,102 E | 2/1999 | Dougherty |
| 6,007,944 A | 12/1999 | Bechtold et al. |
| 6,780,540 B2 | 8/2004 | Hoffman et al. |
| 7,790,310 B2 | 9/2010 | Bechtold et al. |
| 2003/0027040 A1 | 2/2003 | Asahina et al. |
| 2003/0027041 A1 | 2/2003 | Hamada et al. |
| 2003/0031920 A1 | 2/2003 | Hoffman et al. |
| 2003/0059670 A1 | 3/2003 | Bechtold et al. |
| 2003/0077508 A1 | 4/2003 | Asahina et al. |
| 2003/0157402 A1 | 8/2003 | Hamada et al. |
| 2005/0153200 A1 | 7/2005 | Wiepen |

FOREIGN PATENT DOCUMENTS

| | | |
|---|---|---|
| EP | 1 087 449 | 3/2001 |
| EP | 1 091 427 | 4/2001 |
| EP | 1 093 170 | 4/2001 |
| JP | 2003123730 | 4/2003 |
| WO | WO 03/015194 | 2/2003 |
| WO | WO2005/071774 | 8/2005 |

OTHER PUBLICATIONS

International Search Report for PCT/DE2004/002587, date of mailing Apr. 18, 2005, 3 pages.

USPTO, Final Office Action in U.S. Appl. No. 11/455,911, dated Jun. 19, 2009 (10 pages).

USPTO, Non-Final Office Action in U.S. Appl. No. 11/455,911, dated Jan. 29, 2009 (9 pages).

Reply and Amendment to Non-Final Office Action in U.S. Appl. No. 11/455,911 dated Apr. 28, 2009 (17 pages).

USPTO, Final Office Action in U.S. Appl. No. 11/455,911, dated Jul. 22, 2008 (12 pages).

Reply and Amendment to Final Office Action in U.S. Appl. No. 11/455,911, dated Nov. 24, 2008 (20 pages).

Advisory Action in U.S. Appl. No. 11/455,911, dated Dec. 3, 2008 (3 pages).

Request for Continued Examination (RCE) in response to Final Office Action in U.S. Appl. No. 11/455,911, dated Dec. 16, 2008 (3 pages).

USPTO, Non-Final Office Action in U.S. Appl. No. 11/455,911, dated Dec. 14, 2007 (12 pages).

Reply and Amendment to Non-Final Office Action in U.S. Appl. No. 11/455,911, dated Apr. 14, 2008 (20 pages).

USPTO, Office Action Summary for Restriction Requirement in U.S. Appl. No. 11/455,911, dated Oct. 15, 2007 (6 pages).

Amendment and Reply to Office Action Summary for Restriction Requirement in U.S. Appl. No. 11/455,911, dated Nov. 14, 2007 (7 pages).

Reply and Amendment to Final Office Action mailed Jun. 19, 2009, in U.S. Appl. No. 11/455,911, filed Sep. 21, 2009 (20 pages).

Request for Continued Examination (RCE) to Final Office Action mailed Jun. 19, 2009, in U.S. Appl. No. 11/455,911, filed Sep. 21, 2009 (3 pages).

Office Action for U.S. Appl. No. 11/455,911, dated Dec. 15, 2009, 12 pages.

Notice of Allowance for U.S. Appl. No. 11/455,911, dated Jun. 14, 2010, 8 pages.

PRISMATIC RECHARGEABLE BATTERY AND METHOD FOR PRODUCING SUCH A BATTERY

CROSS-REFERENCE TO RELATED PATENT APPLICATIONS

This application is a Divisional of U.S. patent application Ser. No. 11/455,911, filed Jun. 19, 2006, which is a Continuation of International Patent Application No. PCT/DE2004/002587, filed Nov. 23, 2004, which claims priority to and benefit of German Priority Application DE 10 2004 003 066.9, filed Jan. 21, 2004. The disclosures of the following patent applications are incorporated herein by reference in their entirety: U.S. patent application Ser. No. 11/455,911; International Patent Application No. PCT/DE2004/002587; and German Priority Application DE 10 2004 003 066.9.

BACKGROUND

The present invention relates to batteries such as prismatic rechargeable batteries. More specifically, the present invention relates to prismatic rechargeable batteries having a housing which has a plurality of cell vessels which are separated from one another by electrically insulating intermediate walls, and having plate stacks which are formed from stacked electrode plates, with one plate stack being held in each of the cell vessels. The present invention also relates to a method for production of a prismatic rechargeable battery such as this.

Prismatic rechargeable batteries are well known and comprise a plurality of encapsulated battery cells which are arranged alongside one another in a common housing, are each formed from stacked electrode plates, and are filled with electrolyte.

EP 1 087 449 A1 discloses a typical conventional prismatic rechargeable battery. The battery cells, which have a large number of stacked electrode plates, are inserted from above into associated vessels in a housing, with the cover open. The cell vessels are in this case formed by electrically insulating intermediate walls. Output conductor plates are provided on the opposite sides of the battery cells, which are adjacent to the intermediate walls, and are each welded to the positive and negative electrode plates. The output conductor plates are guided upwards in a dead space in the housing in the area of the cover, where they are welded to the adjacent output conductor plate, in order to produce an electrical connection.

In order to shorten the current-carrying paths, WO 03/015194 A1 proposes that contact connections on the front face be welded in cutouts in the housing to the respective battery cells which are adjacent to output conductor plates arranged on the opposite sides of an intermediate wall.

It would be advantageous to provide an improved prismatic rechargeable battery which has as low an internal resistance as possible and has a higher packing density to reduce dead space within the battery. It would also be advantageous to provide an improved method for the production of a prismatic rechargeable battery.

SUMMARY

An exemplary embodiment relates to a method for producing a prismatic rechargeable battery that includes providing a battery housing comprising a plurality of cell vessels separated by intermediate walls. The method also includes providing contact connector plates on opposite sides of each of the intermediate walls and electrically coupling the contact connector plates provided on opposite sides of the intermediate walls to each other through their associated intermediate walls. The method further includes arranging plate stacks in the cell vessels, each of the plate stacks having a plurality of contacts and coupling the electrical contacts of the plate stacks to contact connector plates provided on the intermediate walls. The method further includes closing the housing such that the cell vessels and the housing are sealed.

An exemplary embodiment relates to a method for producing a prismatic rechargeable battery that includes providing a plurality of plate stacks, the plate stacks comprising stacked electrode plates and a plurality of contacts. The method also includes providing a housing configured to receive the plurality of plate stacks, the housing comprising a plurality of intermediate walls spaced apart from one another to receive one of the plurality of plate stacks. The method also includes coupling contact connector plates to each of the intermediate walls such that each of the contact connector plates is in electrical contact with at least one of the plurality of contacts of one of the plurality of plate stacks. Each of the intermediate walls has a contact connector plate on a first side thereof electrically coupled to a contact connector plate on a second side thereof through the intermediate wall.

An exemplary embodiment relates to a method for producing a prismatic rechargeable battery that includes providing a housing comprising a plurality of walls defining a plurality of internal chambers. The method also includes providing a plurality of electrochemical cells in the housing, each of the cells provided in one of the internal chambers and comprising a plurality of electrode plates and a plurality of contacts. Each wall has a first contact connector plate on a first side thereof that is electrically coupled to a second contact connector plate on a second side thereof. Additionally, each of the contact connector plates is in electrical contact with a contact of one of the plurality of electrochemical cells.

BRIEF DESCRIPTION OF THE DRAWINGS

The invention will be explained in more detail in the following text with reference to the attached drawings, in which.

DETAILED DESCRIPTION

Figure 1:
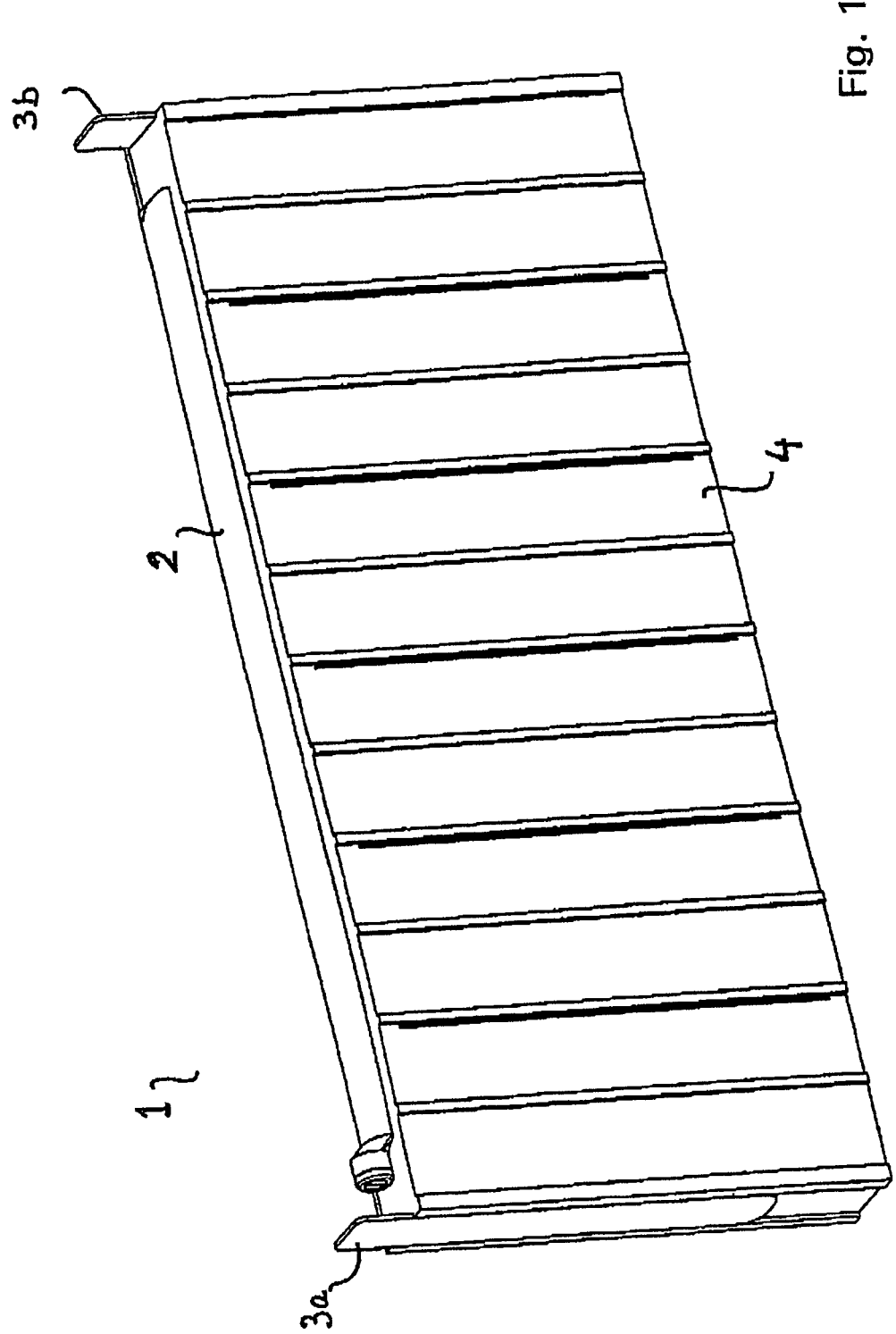
FIG. 1 shows a perspective illustration of a prismatic rechargeable battery according to an exemplary embodiment.

According to an exemplary embodiment, a method of producing a prismatic rechargeable battery includes the steps of (a) production of an electrical connection between contact connector plates which are in each case arranged on the opposite sides of an intermediate wall, through the intermediate wall; (b) arrangement of plate stacks in the cell vessels which are formed by the intermediate walls; (c) welding of the electrical contacts of the plate stacks to the contact connector plates; and (d) closure of the housing in such a manner that the cell vessels and the housing are sealed.

The prismatic rechargeable battery includes contact connector plates that extend along each of the intermediate walls, are electrically conductively connected to one another through the intermediate wall on contact connector plates which are opposite on the intermediate wall, and the contacts of the plate stacks are electrically conductively connected to the associated contact connector plates.

The additional contact connector plates make it possible to first of all produce an electrical field-contact between adjacent contact connector plates through the respective intermediate wall. In consequence, no dead space is required in the cover in order to make contact. Furthermore, this creates an approximately direct connection between the contact connector plates with as low an internal resistance as possible.

Once the plate stacks have been introduced into the cell vessels, the contacts on the plate stacks can then be electrically conductively connected to the contact connector plates, for example by welding, soldering, or brazing.

In order to further reduce the internal resistance, it is advantageous if the contact connector plates are electrically connected a plurality of times over their length to an associated contact connector plate which is arranged on the opposite side of the intermediate wall. A particularly low internal resistance can be achieved if the electrical connection of associated contact connector plates is produced by a clinch-joining process by cold-surface-pressing of the associated contact connector plates.

The contacts on the plate stacks are preferably in the form of output conductor plates, with the side edges of the positive electrode plates in a plate stack being welded to a first output conductor plate, and the side edges of the negative electrode plates in the plate stack being welded to a second output conductor plate at the opposite end of the plate stack. The output conductor plates are then preferably welded to the associated contact connector plates over the entire length.

It is particularly advantageous for the contacts in the plate stacks to be welded to the associated contact connector plates, and, furthermore, to be soldered to the outer edges of the welded joint. This makes it possible to achieve a mechanically high-strength joint, which is electrically highly conductive, can carry high currents and has a very low internal resistance.

Simple design and production of the prismatic rechargeable battery are achieved by inserting the plate stacks into the cell vessels on the front face of the housing, rather than from above in the conventional manner. The side edges of the output conductor plates and contact connector plates are then exposed, and can easily be welded to one another, and if required soldered, in an accessible manner. The front cover of the housing is then placed on the side edges to the intermediate walls and side edges of the housing and is welded to them, forming a seal, for example by means of known laser welding methods.

FIG. 1 shows a perspective view of a prismatic rechargeable battery 1. A degassing channel 2 is placed on the upper face of the housing. Furthermore, connecting contacts 3a, 3b for the positive and negative pole connection of the prismatic rechargeable battery 1 are fitted to the mutually opposite narrow faces of the housing.

The housing of the rechargeable battery 1 is closed by a front cover 4, which is placed on the housing and is welded to it, forming a seal.

Figure 2:
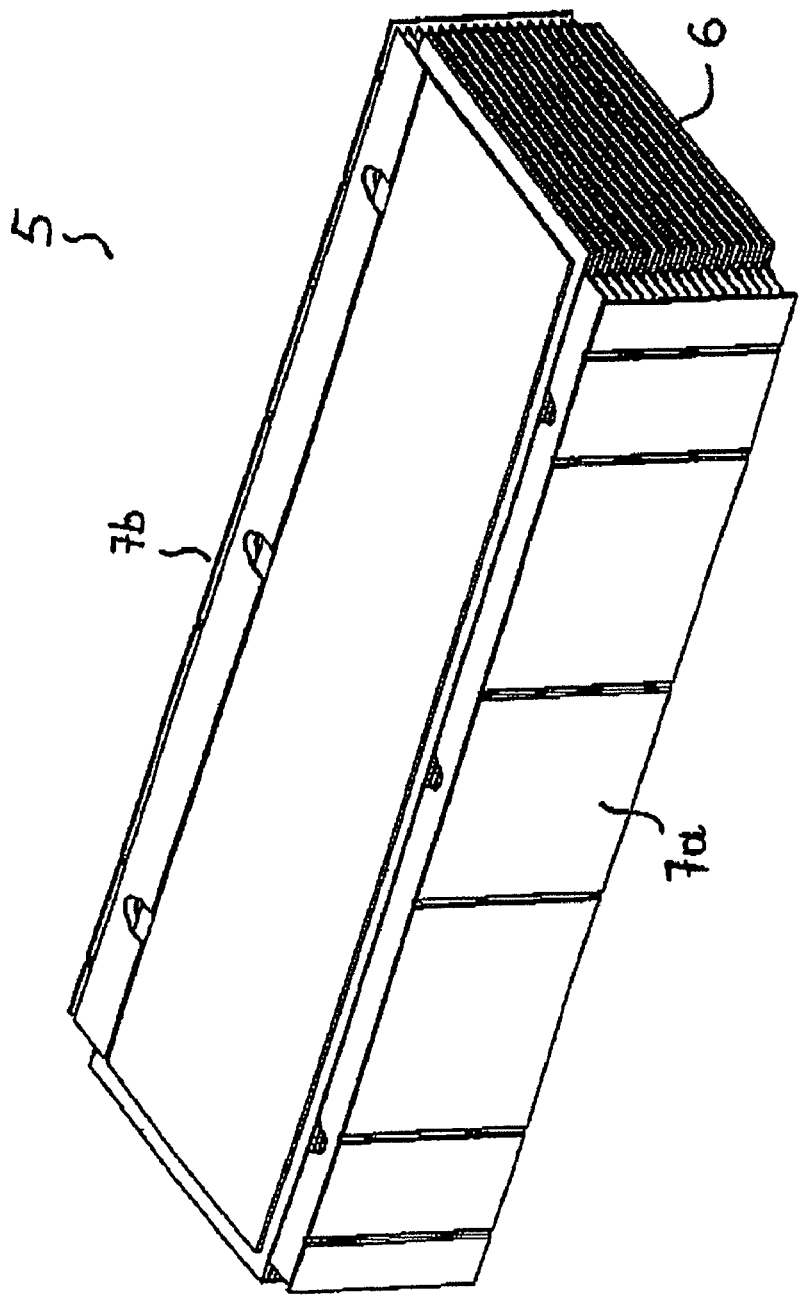
FIG. 2 shows a perspective illustration of a plate stack with stacked electrode plates and output conductor plates.
Figure 3:
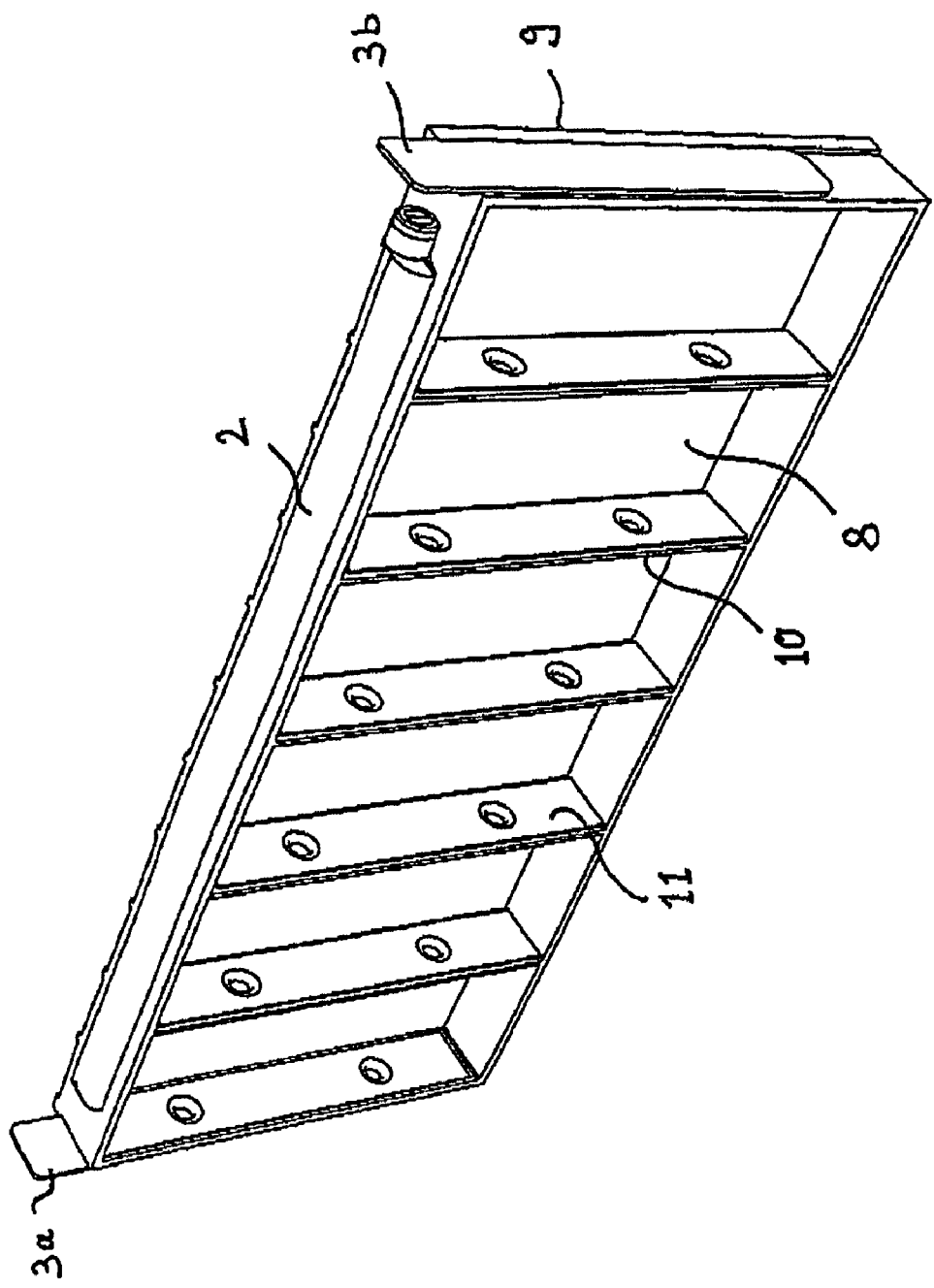
FIG. 3 shows a perspective illustration of the opened housing of the prismatic rechargeable battery shown in FIG. 1, without a front panel.

FIG. 2 shows a perspective view of a plate stack 5. This clearly shows that a large number of positive and negative electrode plates 6, which are stacked alternately one on top of the other, form the plate stack 5. The connecting lugs of the positive electrode plates 6 are passed to the outside on one side of the plate stack 5, where they are electrically conductively connected and mechanically joined to an output conductor plate 7a with the aid of known laser welding processes. The connections of the negative electrode plates 6 are connected in a corresponding manner to an output conductor plate 7b on the opposite side of the plate stack 5.

Plate stacks 5 (battery cells) such as these which are known per se are introduced into cell vessels 8 which are formed in the housing 9 by intermediate walls 10 which extend from the bottom to the cover of the housing 9. Contact connector plates 11 are provided on both upper faces of the intermediate walls 10 and extend over the entire length of the intermediate walls 10. The contact connector plates 11 which are located opposite on one intermediate wall 10 make contact with one another through the intermediate wall 10. This is preferably done with the aid of clinch joining processes, by the contact connector plates 11 being cold-joined without any additional material, in the area of the hole in the intermediate walls 10. The connecting contacts 3a, 3b are connected in a corresponding manner to the outer contact connector plates 11 on the inner walls of the narrow faces of the housing 9.

Figure 4:
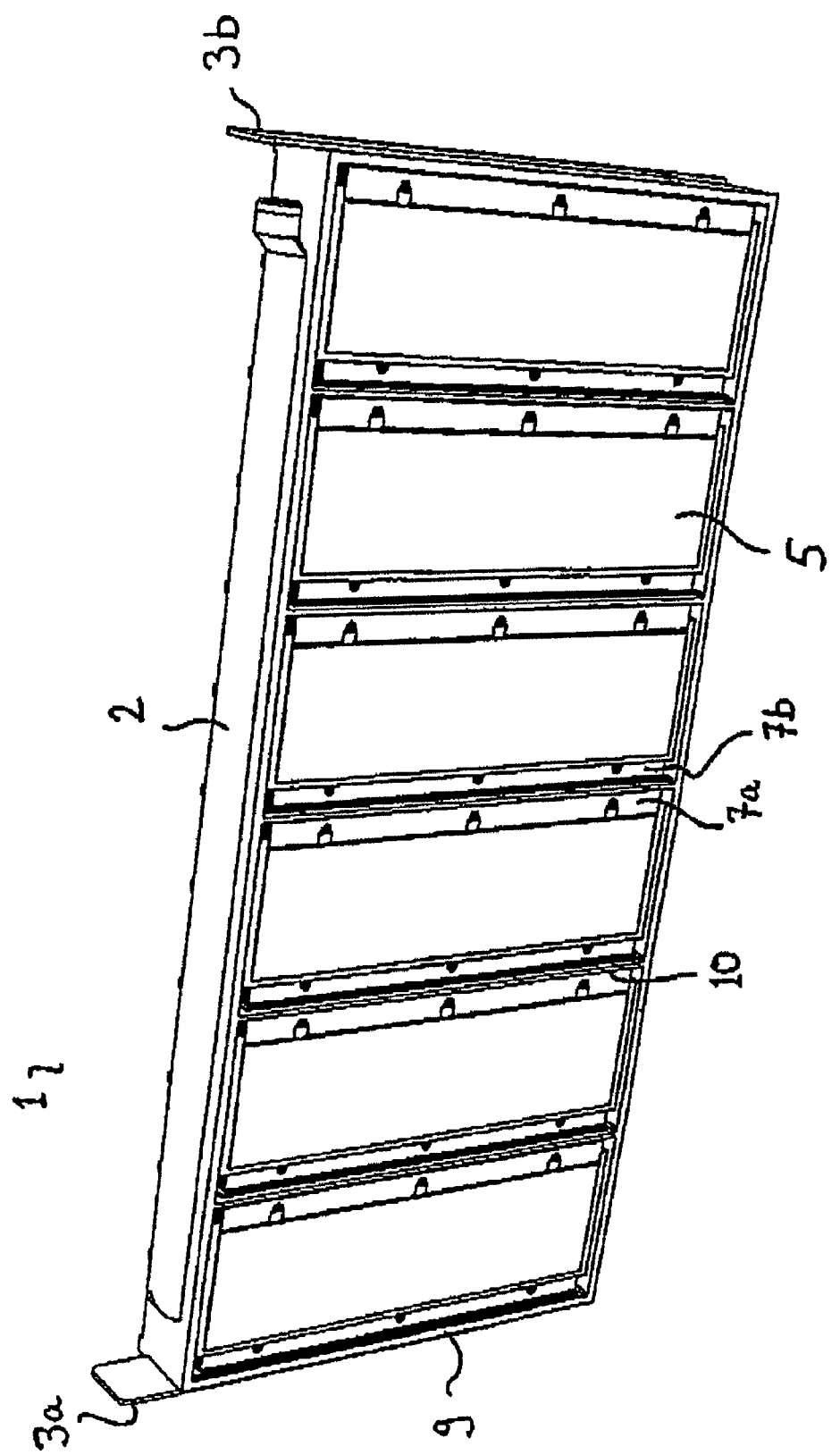
FIG. 4 shows a perspective illustration of the prismatic rechargeable battery shown in FIG. 1, with a plate stack having been inserted into the cell vessels, but without a front panel.

As can be seen from FIG. 4, the plate stacks 5 are inserted into the cell vessels 8 in the housing 9. In this case, there is no longer any need for any dead space in the upper and lower area of the housing 9, since contact is made between the plate stacks 5 via the output conductor plates 7 and contact connector plates 11 on the longitudinal face of the plate stacks 5, and not in the area of the cover of the housing 9.

For this purpose, the output conductor plates 7 and contact connector plates 11, which are located directly alongside one another, are welded and/or soldered to one another, preferably over the entire length of the exposed edges of the output conductor plates 7 and contact connector plates 11, with the housing 9 open and without the front cover 4. It is particularly advantageous for a soldered joint to be applied to the outer edge of the weld bead or the output conductor plate 7 and contact connector plate 11.

Figure 5:
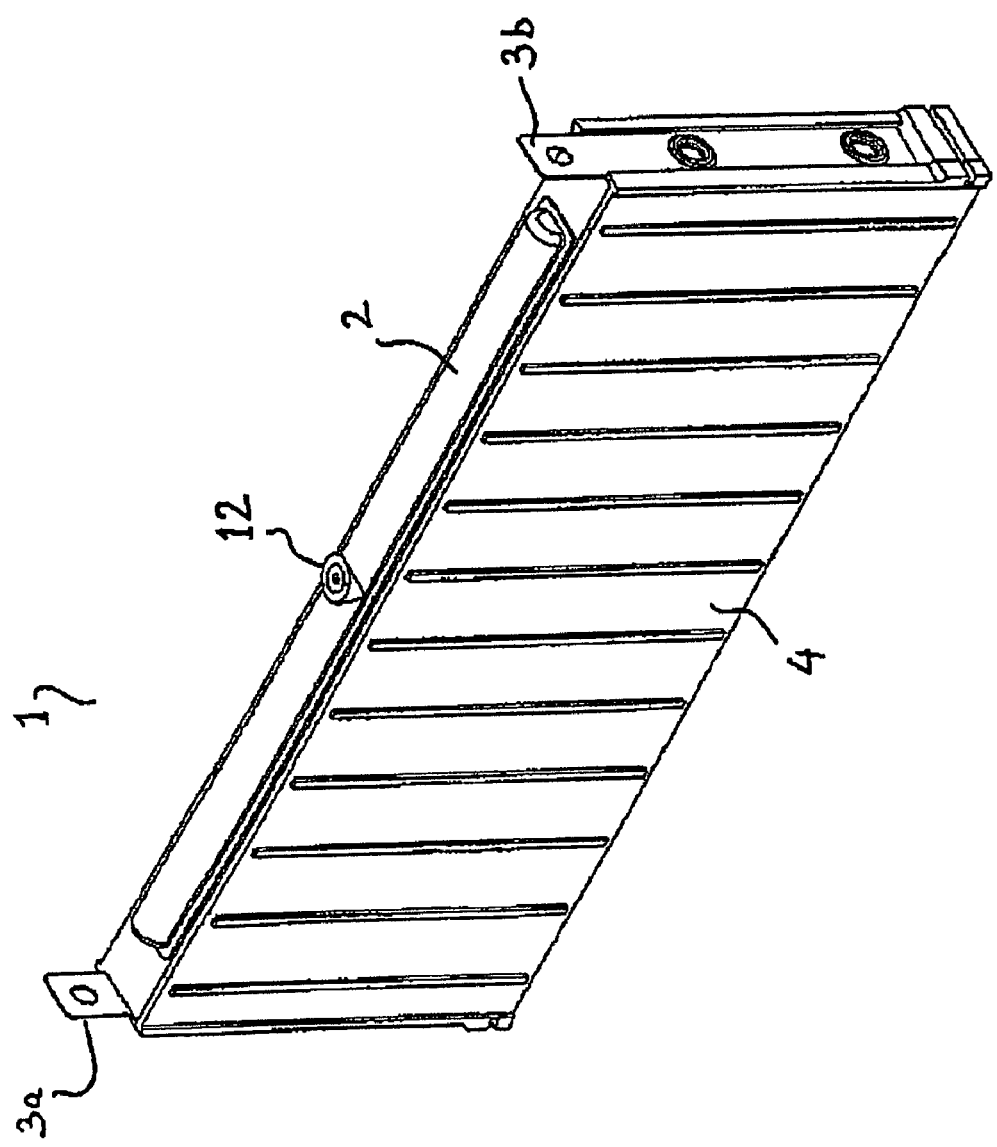
FIG. 5 shows a perspective illustration of a second embodiment of a prismatic rechargeable battery according to an exemplary embodiment.

FIG. 5 shows a perspective view of a second embodiment of a prismatic rechargeable battery 1. The connecting contacts 3a and 3b are cold-surface-pressed by means of a clinch joining process to the associated internal contact connector plate at two points over the height of the rechargeable battery 1. Furthermore, the degassing valve 12 for the degassing channel is provided centered in the degassing channel 2 rather than on the side, as in the first embodiment shown in FIG. 1.

Figure 6:
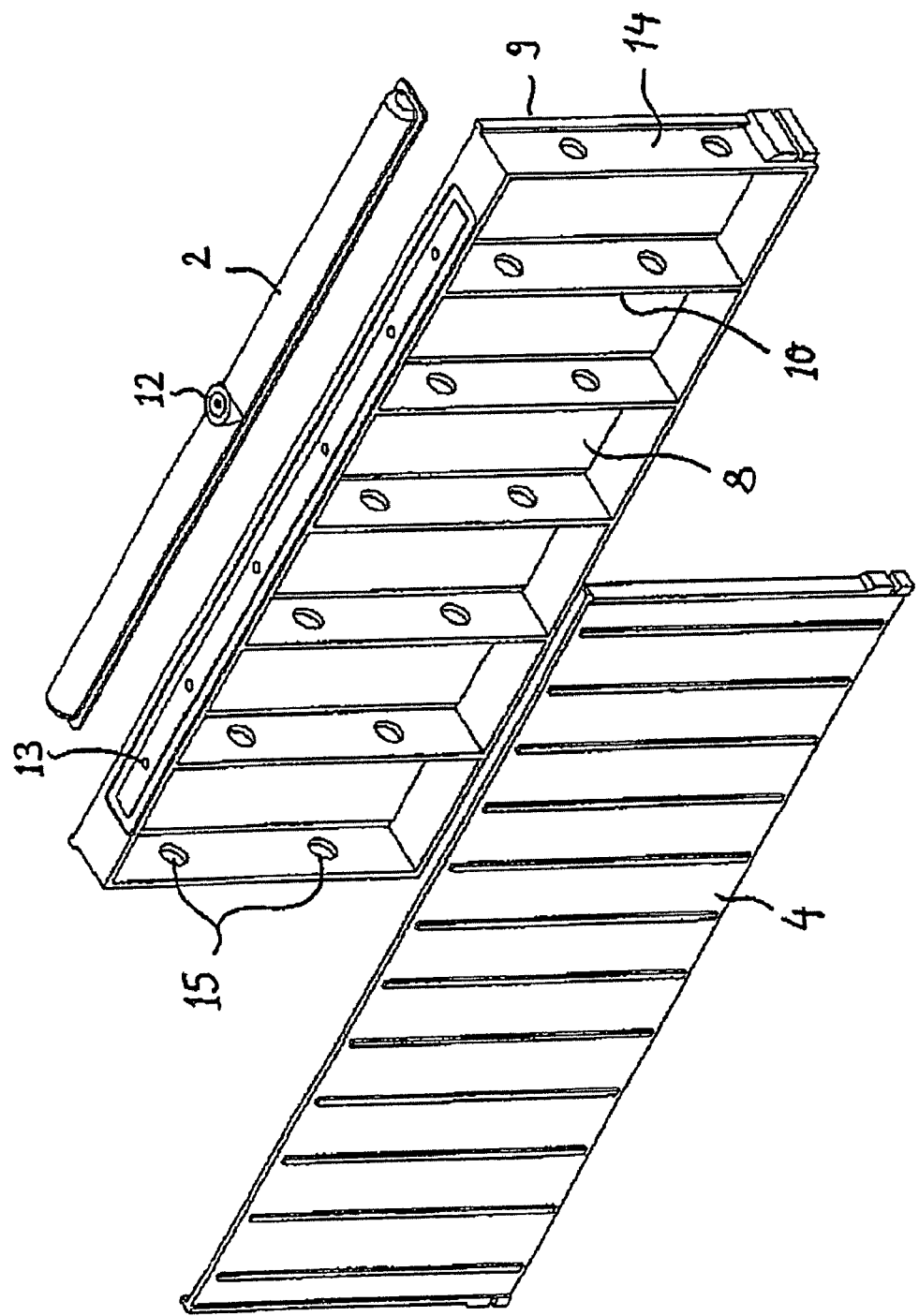
FIG. 6 shows a perspective exploded view of the housing of the prismatic rechargeable battery shown in FIG. 5.

FIG. 6 shows an exploded view of the prismatic rechargeable battery 1 shown in FIG. 5. The degassing channel 2 is placed on the upper face of the housing 9, in which degassing holes 13 are incorporated for each cell vessel 8.

Two holes 15 are in each case provided on the outer narrow faces 14 of the housing and on the intermediate walls 10, through which adjacent contact connector plates 11 are connected to one another, and contact connector plates 11 are electrically conductively permanently connected to one another, by means of the contact connections 3, on the narrow faces 14. A clinch joining process is preferably used for this purpose. Other methods, such as screwing, riveting, welding, soldering, and the like are, however, also possible.

If required, sealing elements are provided, such as O-rings or a coating in order to seal the holes 15, once contact has been made with the contact connector plates 11.

The use of a plurality of connection points within the physical height of the contact connector plates 11 further reduces the internal resistance.

Figure 7:
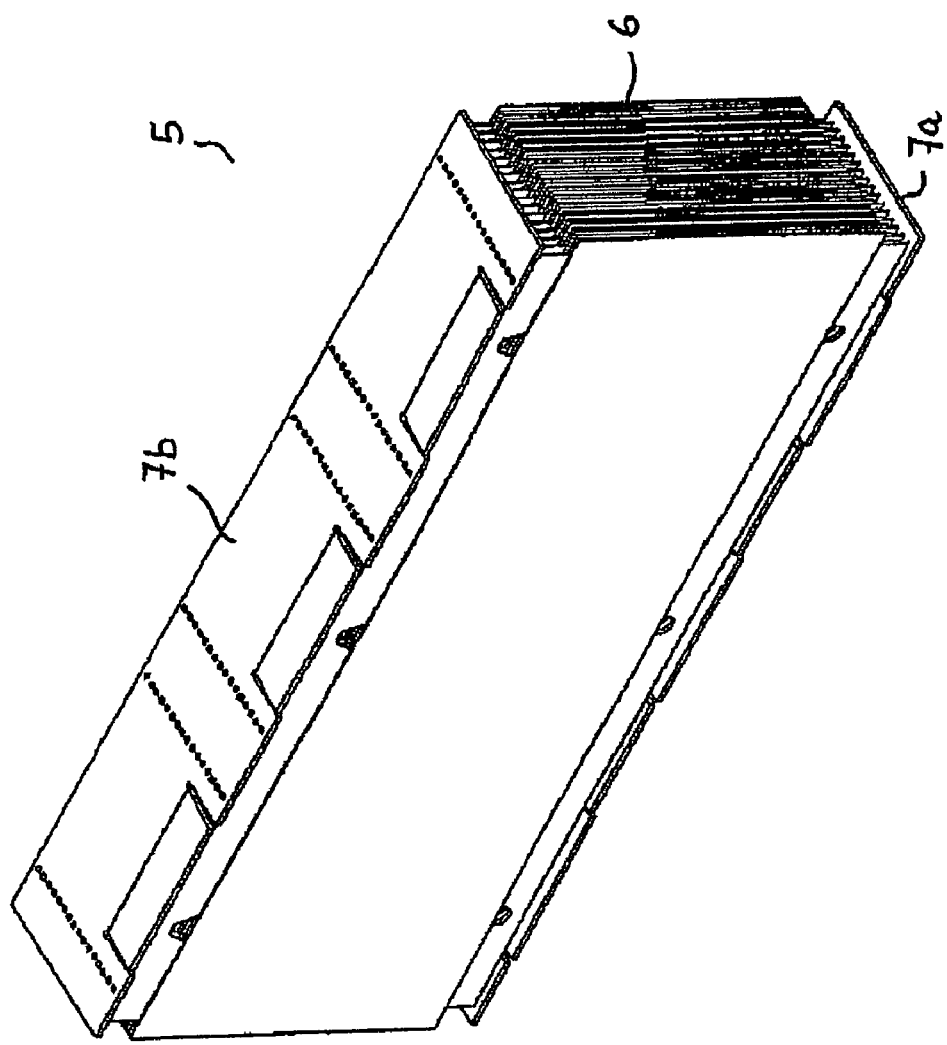
FIG. 7 shows a perspective illustration of a plate stack with a second embodiment of output conductor plates.

FIG. 7 shows a perspective view of a plate stack 5 with one exemplary embodiment of output conductor plates 7. These are connected to the contact lugs of associated electrode plates 6 at a plurality of points in the lateral direction, by means of a laser welding process.

Figure 8:
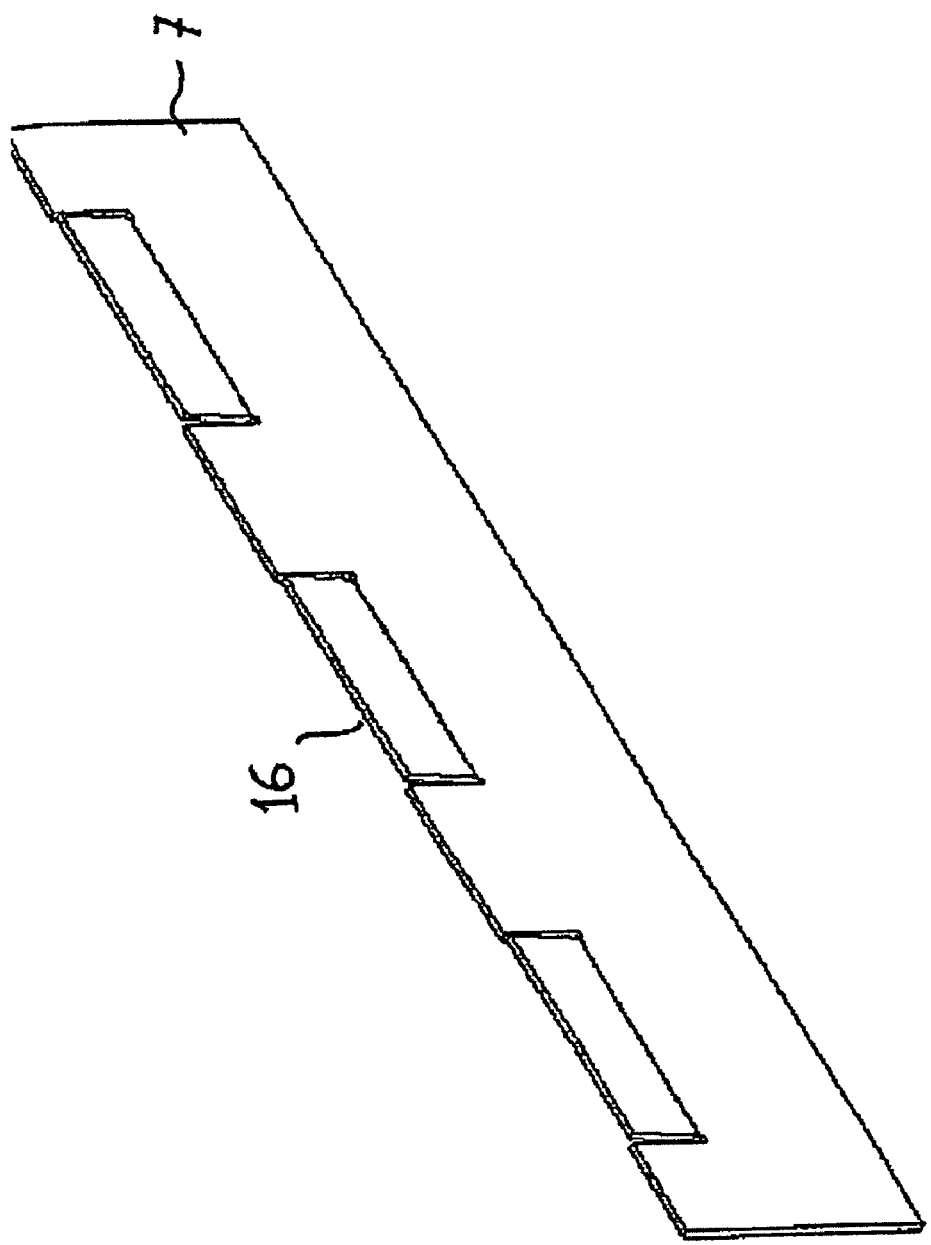
FIG. 8 shows a perspective illustration of the output conductor plate shown in FIG. 7.

As can clearly be seen from FIG. 7 and the perspective detailed view of the output conductor plates 7 in FIG. 8, the improved embodiment of the output conductor plate 7 has slightly angled connecting sections 16 cut into it. These connecting sections 16 are located in the area of the housing opening, with the front cover 4 removed, in a plate stack 5 which has been inserted into the cell vessel 8. By way of example, three connecting sections 16 are provided over the length of the output conductor plate 7.

Figure 9:
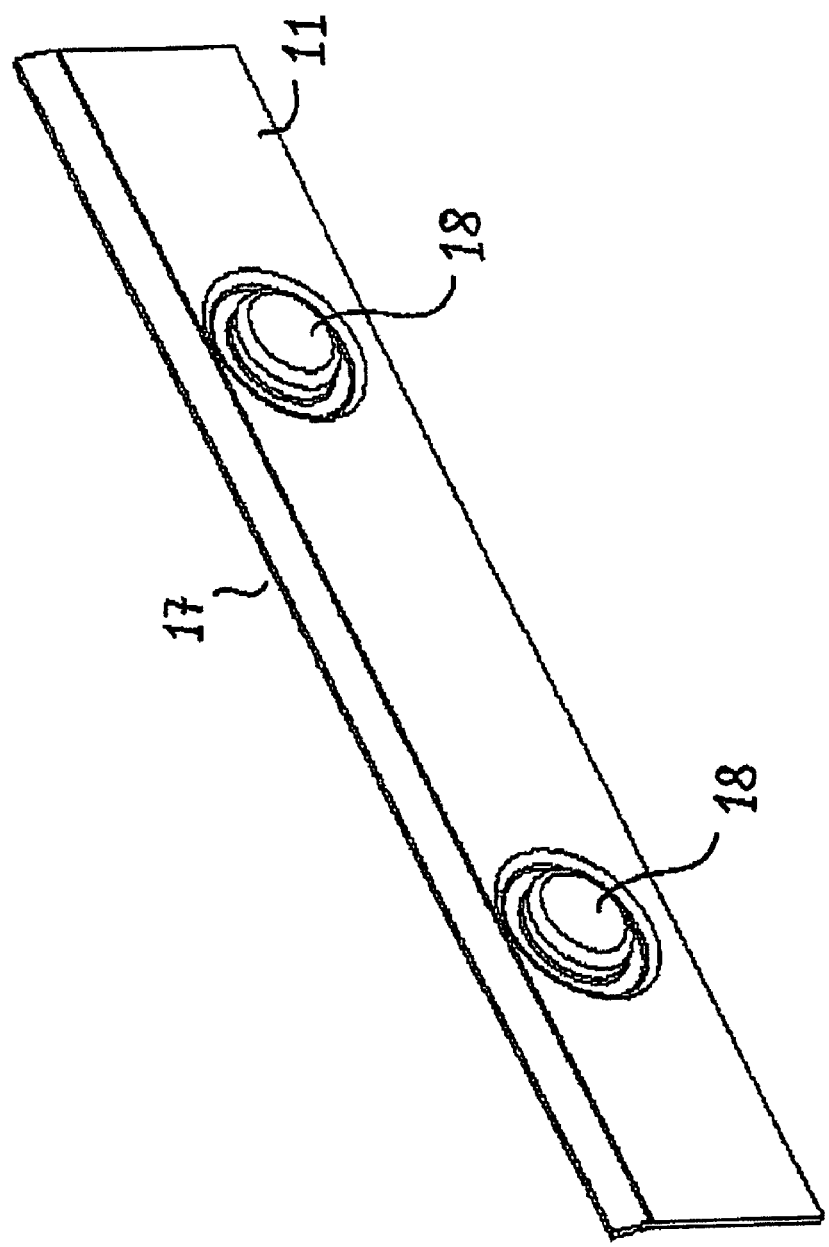
FIG. 9 shows a perspective illustration of a contact connector plate.

FIG. 9 shows one exemplary embodiment of a contact connector plate 11 which likewise has an angled outer edge 17, which is adjacent to the connecting sections 16 of the associated output conductor plate 7 when the rechargeable battery 1 is in the assembled state.

As can also be seen, cylindrical contact sections 18 with a circumferential recess are preformed in the area of the holes 15 in the intermediate walls 10. The insertion of pressing tools into the cylindrical contact sections 18 and the application of a high pressure force make it possible to produce a permanent cold-form joint between the contact sections 18 of adjacent contact connector plates 11 through the hole 15 in the intermediate wall 10 between them. A joint such as this has a very low internal resistance.

Figure 10:
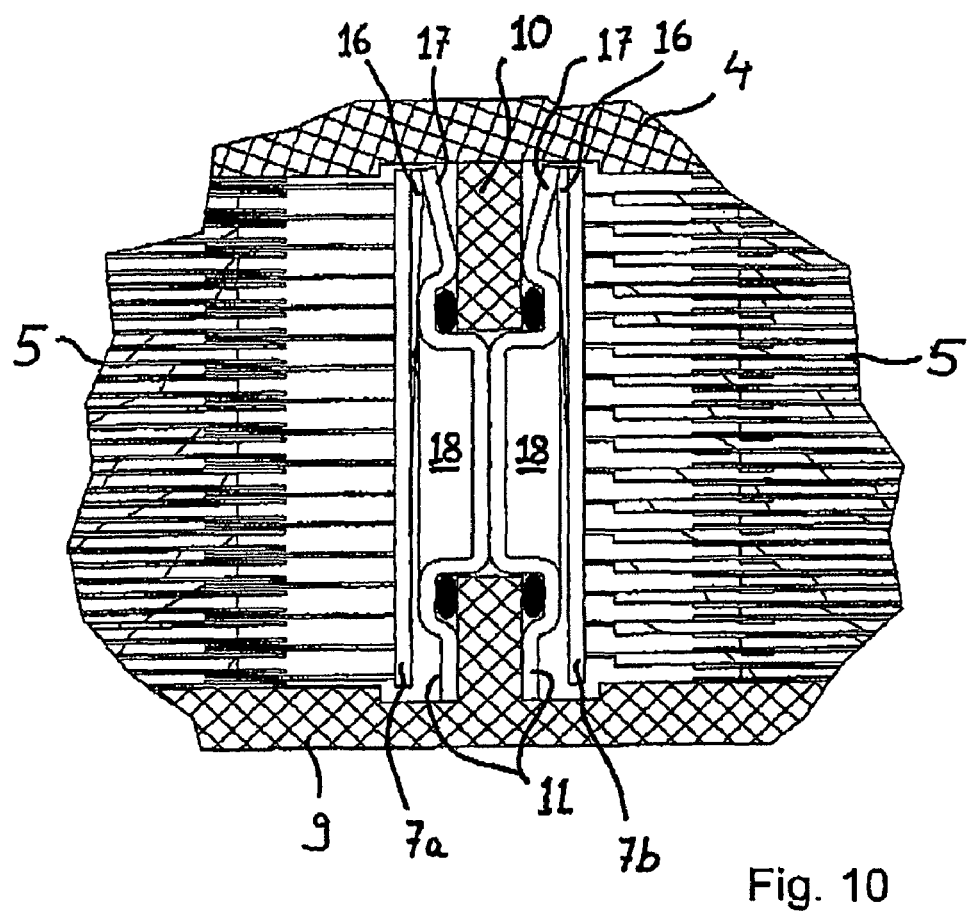
FIG. 10 shows a section view of a detail of the prismatic rechargeable battery shown in FIG. 6 in the area of the intermediate walls and of the connections between adjacent plate stacks.

FIG. 10 shows a section view through a detail of the prismatic rechargeable battery 1, as is sketched in FIGS. 5 to 9. This shows a detail of the housing in the area of an intermediate wall 10, onto which a front cover 4 is fitted in order to close the housing 9. The front cover 4 which closes the front face of the housing 9 is located at the top in the illustration.

As can also be seen, the connecting sections 16 of the output conductor plate 7a, 7b of the plate stacks 5 which have been inserted into the cell vessels 8 are aligned with the adjacent front cover 4 and are angled from the respective plate stack 5 in the direction of the adjacent cell wall 10.

As can also be seen, the contact connector plates 11 which are arranged on both sides of the intermediate wall 10 are electrically connected to one another by means of the contact sections 18 through the intermediate wall 10. The outer edge 17 of the contact connector plates 11, which is adjacent to the front cover 4, extends away from the intermediate wall 10 to the adjacent output conductor plate 7. The angled outer edge 17 of a contact connector plate 11 is welded to the adjacent angled connecting section 16 of the associated output conductor plate 7. A soldered joint is preferably also formed between the contact connector plate 11 and the associated output conductor plate 7 on the outer edges of the welded joint.

It is important to note that the construction and arrangement of the prismatic rechargeable battery as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. A method for producing a prismatic rechargeable battery comprising:
providing a battery housing comprising a front side that is substantially open to expose a plurality of cell vessels separated by intermediate walls;
providing contact connector plates on opposite sides of each of the intermediate walls;
electrically coupling the contact connector plates provided on opposite sides of the intermediate walls to each other through their associated intermediate walls;
inserting a plurality of plate stacks into the cell vessels through the front side of the housing, each of the plate stacks having a plurality of electrical contacts;
coupling the electrical contacts of the plate stacks to the contact connector plates provided on the intermediate walls; and
closing the housing such that the cell vessels and the housing are sealed;
wherein the step of closing the housing comprises placing a front panel on side edges of the intermediate walls which are integrally formed with the housing and on the outer walls of the housing, the front panel being connected to the side edges to form a seal;
wherein the area covered by the front panel is substantially the same as the area of the largest side of the prismatic rechargeable battery.

2. The method of claim 1 further comprising using a clinch joining process to couple the contact connector plates on opposite sides of the intermediate walls to each other through their associated intermediate walls.

3. The method of claim 1 wherein the plate stacks further comprise output conductor plates, and further comprising welding the output conductor plates to the associated contact connector plates.

4. The method of claim 3 wherein positive electrode plates in a plate stack are welded on a first side edge to a first output conductor plate and negative electrode plates in the plate stack are welded on a second side edge opposite the first side edge to a second output conductor plate.

5. The method of claim 4 further comprising producing soldered joints in the outer edges of the welded joint between the contacts of the plate stack and the associated contact connector plates.

6. The method of claim 1 further comprising welding the electrical contacts of the plate stacks to the contact connector plates.

7. The method of claim 1 wherein the housing further comprises a degassing channel that includes a degassing valve centrally located in the degassing channel.

8. The method of claim 7 wherein the cell vessels are connected to the degassing channel by a plurality of degassing holes that extend through a side of the housing.

9. A method for producing a prismatic rechargeable battery comprising:
   providing a plurality of plate stacks, the plate stacks comprising stacked electrode plates and a plurality of contacts;
   providing a housing configured to allow insertion of the plurality of plate stacks through an open front of the housing, the housing comprising a plurality of intermediate walls spaced apart from one another to receive one of the plurality of plate stacks;
   positioning contact connector plates relative to each of the intermediate walls such that each of the contact connector plates is in electrical contact with at least one of the plurality of contacts of one of the plurality of plate stacks, each intermediate wall having a contact connector plate on a first side thereof that is electrically coupled to a contact connector plate on a second side thereof; and
   accessing a plurality of exposed side edges of the contact connector plates and a plurality of exposed side edges of the plate stacks through the open front of the housing to couple the contact connector plates to the plate stacks along their adjacent exposed side edges;
   wherein the area of the open front is substantially the same as the area of the largest side of the prismatic rechargeable battery.

10. The method of claim 9 wherein the contact connector plates on the first sides of the intermediate walls are electrically coupled to the contact connector plates on the second sides of the intermediate walls at a plurality of locations.

11. The method of claim 10 wherein the contact connector plates extend the full length of the intermediate walls.

12. The method of claim 9 wherein a front cover of the housing is welded to side edges of the intermediate walls and side walls of the housing to form a seal.

13. The method of claim 9 wherein the plate stack comprises positive electrode plates and negative electrode plates, and side edges of the positive electrode plates are welded to a first output conductor plate and side edges of the negative electrode plates are welded to a second output conductor plate at the opposite end of the plate stack.

14. The method of claim 13 wherein the first and second output conductor plates have slightly angled connecting sections.

15. The method of claim 14 wherein the contact connector plates have an angled outer edge configured to contact the slightly angled connecting sections of the first and second output conductor plates.

16. The method of claim 15 wherein coupling the contact connector plates to the plate stacks along their adjacent exposed side edges comprises welding the angled outer edge of the contact connector plates to the slightly angled connecting sections of the associated first and second output conductor plates.

17. The method of claim 16 wherein a soldered joint is also formed between the contact connector plates and the associated output conductor plates on the outer edges of the welded joint.

18. A method for producing a prismatic rechargeable battery comprising:
   providing a housing comprising a plurality of side walls and intermediate walls that define a plurality of internal chambers; and
   providing a plurality of electrochemical cells in the housing, each of the cells provided in one of the internal chambers and comprising a plurality of electrode plates and a plurality of contacts;
   wherein each wall has a first contact connector plate on a first side thereof that is electrically coupled to a second contact connector plate on a second side thereof;
   wherein each of the contact connector plates is in electrical contact with a contact of one of the plurality of electrochemical cells;
   wherein a single external front cover is coupled to the longitudinal side edges of the side walls and intermediate walls of the housing, the single external front cover sealing the internal chambers;
   wherein the area covered by the front cover is substantially the same as the area of the largest side of the prismatic rechargeable battery.

19. The method of claim 18 wherein the contact connector plates on the first sides of the intermediate walls are electrically coupled to the contact connector plates on the second sides of the intermediate walls at a plurality of locations.

* * * * *